US012586413B2

(12) United States Patent
Francesca et al.

(10) Patent No.: US 12,586,413 B2
(45) Date of Patent: Mar. 24, 2026

(54) METHOD FOR RECOGNIZING ACTIVITIES USING SEPARATE SPATIAL AND TEMPORAL ATTENTION WEIGHTS

(71) Applicant: TOYOTA MOTOR EUROPE, Brussels (BE)

(72) Inventors: Gianpiero Francesca, Brussels (BE); Luca Minciullo, Brussels (BE); Lorenzo Garattoni, Brussels (BE); Srijan Das, Nice (FR); Rui Dai, Biot (FR); Francois Bremond, Villeneuve Loubet (FR)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 603 days.

(21) Appl. No.: 17/754,685

(22) PCT Filed: Oct. 9, 2019

(86) PCT No.: PCT/IB2019/001142
§ 371 (c)(1),
(2) Date: Apr. 8, 2022

(87) PCT Pub. No.: WO2021/069945
PCT Pub. Date: Apr. 15, 2021

(65) Prior Publication Data
US 2023/0134967 A1     May 4, 2023

(51) Int. Cl.
*G06K 9/00*     (2022.01)
*G06N 3/0442*     (2023.01)
(Continued)

(52) U.S. Cl.
CPC .......... *G06V 40/20* (2022.01); *G06N 3/0442* (2023.01); *G06N 3/045* (2023.01); *G06N 3/0464* (2023.01);
(Continued)

(58) Field of Classification Search
None
See application file for complete search history.

(56) References Cited

U.S. PATENT DOCUMENTS

2020/0074227 A1*   3/2020  Lan ....................... G06F 18/214

OTHER PUBLICATIONS

Yun ("Two-person interaction detection using body-pose features and multiple instance learning", IEEE Computer Society Conference, Jun. 2012, pp. 1-8) (Year: 2012).*

(Continued)

*Primary Examiner* — Wei Wen Yang
(74) *Attorney, Agent, or Firm* — Dickinson Wright, PLLC

(57)     ABSTRACT

A device and a method for recognizing person activity in a sequence of frames (100) comprising: obtaining a set of consecutives 3D poses (103), obtaining a feature map (102), obtaining a vector of spatiotemporal features, obtaining a matrix of spatial attention weights, obtaining a matrix of temporal attention weights (110), modulating (106) the feature map using the matrix of spatial attention weights to obtain a spatially modulated feature map, modulating (111) the feature map using the vector of temporal attention weights to obtain a temporally modulated feature map, performing a convolution (114) of the spatially modulated feature map and of the temporally modulated feature map to obtain a convoluted feature map, performing a classification (115) using the convoluted feature map so as to determine the activity of the person in the video.

11 Claims, 3 Drawing Sheets

(51) Int. Cl.

| | |
|---|---|
| *G06N 3/045* | (2023.01) |
| *G06N 3/0464* | (2023.01) |
| *G06V 10/46* | (2022.01) |
| *G06V 10/82* | (2022.01) |
| *G06V 20/40* | (2022.01) |
| *G06V 40/20* | (2022.01) |

(52) U.S. Cl.
CPC ............ *G06V 10/462* (2022.01); *G06V 10/82* (2022.01); *G06V 20/41* (2022.01); *G06V 20/46* (2022.01)

(56) References Cited

OTHER PUBLICATIONS

Hou Jingxuan et al: "Spatial-Temporal Attention Res-TCN for Skeleton-Based Dynamic Hand Gesture Recognition", Jan. 23, 2019 (Jan. 23, 2019), Robocup 2008: Robot Soccer World Cup XII ; [Lecture Notes in Computer Science], Springer-International Publishing, Cham, pp. 273 286, XP047501299, ISBN: 978-3-319-10403-4 [retrieved on Jan. 23, 2019].

Sijie Song et al: "An End-to-End Spatio-Temporal Attention Model for Human Action Recognition from Skeleton Data", arxiv.org, Cornell University Library, 201 Olin Library Cornell University Ithaca, NY 14853, Nov. 18, 2016 (Nov. 18, 2016), XP080733001.

Chan Wensong et al: "Select and Focus: Action Recognition with Spatial-Temporal Attention", Aug. 2, 2019 (Aug. 2, 2019), Robocup 2008: Robot Soccer World Cup XII; [Lecture Notes in Computer Science], Springer International Publishing, Cham, pp. 461-471, XP047515970, ISBN: 978-3-319-10403-4 [retrieved on Aug. 2, 2019].

Fabien Baradel et al: "Human Action Recognition: Pose-based Attention draws focus to Hands", arxiv.org, Cornell University Library, 201 Olin Library Cornell University Ithaca, NY 14853, Dec. 20, 2017 (Dec. 20, 2017), XP080842439.

Joao Carreira et al: "Quo Vadis, Action Recognition? A New Model and the Kinetics Dataset", arXIV.1705.07750v3 [cs.CV] Feb. 12, 2018.

Christoph Feichtenhofer et al: "SlowFast Networks for Video Recognition", arXIV.1812.03982v3 [cs.CV] Oct. 29, 2019.

Fabien Baradel et al: "Glimpse Clouds: Human Activity Recognition from Unstructured Feature Points", arXIV.1802.07898v4 [cs.CV] Aug. 21, 2018.

* cited by examiner

1

METHOD FOR RECOGNIZING ACTIVITIES USING SEPARATE SPATIAL AND TEMPORAL ATTENTION WEIGHTS

RELATED APPLICATION

This application is a 371 of International Patent Application No. PCT/IB2019/001142, filed on Oct. 9, 2019, including the specification, drawings and abstract, the entire disclosure of which is incorporated herein by reference.

FIELD OF THE DISCLOSURE

The present disclosure relates to the field of person activity recognition in a video.

DESCRIPTION OF RELATED ART

The task of person activity recognition in a video concerns recognizing the activities of persons appearing in the frames of the video. For example, multiple persons can perform different activities in a frame.

From the prior art, various solutions have been proposed to recognize the activity of persons in a video.

The person skilled in the art knows of documents discussing actions of daily living (ADL) and of solutions such as dense trajectory, two stream networks, or Long-term Recurrent Convolutional Network (LRCN).

Document "Carreira et al., "Quo Vasis, Action recognition? A new model and the kinetics dataset," in CVPR, 2017, pp. 4724-4733" proposes a method called I3D which fabricated spatio-temporal convolutional operations which are efficient for activity recognition of large scale internet videos. These spatio-temporal operations are inflated from 2D kernels (I3D), pre-trained on ImageNet and Kinetics to recognize diverse activities with high accuracy. However, such 3D convolutional neural networks do not exploit the salient part of a video, in time and in space.

The solution of this document has extended attention mechanism for both spatial and temporal attention on either 3D joint coordinates or RGB hand patches.

There has also been proposed attention mechanism in addition to deep networks such as long short-term memory (LSTM), as described in "Glimpse clouds: Human activity recognition from unstructured feature points" (F. Baradel, C. Wolf, J. Mille, and G. W. Taylor, In The IEEE Conference on Computer Vision and Pattern Recognition (CVPR), June 2018). This document proposes applying a spatial attention mechanism using Spatial Transformer Networks for focusing on the salient parts of the images. The authors of the document invoke temporal attention using different Recurrent Neural Networks.

The inventors of the present invention have observed that some solutions of the prior art fail to recognize activities with similar appearances and low motion.

SUMMARY

The present disclosure overcomes one or more deficiencies of the prior art by proposing a method for recognizing person activity in a video comprising a sequence of frames, each frame showing at least a portion of the person, the method comprising:

obtaining a set of consecutives 3D poses of the person using the sequence of frames, each pose illustrating a posture of the person from a frame of the sequence of frames,

obtaining a feature map elaborated using a first encoder neural network configured to receive the sequence of frames as input and to output the feature map having dimensions associated with time, space, and a number of channels, obtaining a vector of spatiotemporal features using a second recurrent neural network outputting the vector of spatiotemporal features and receiving as input the set of consecutive poses, obtaining, using the vector of spatiotemporal features and a third neural network, a matrix of spatial attention weights wherein each weight indicates the importance of a location in the matrix, obtaining, using the vector of spatiotemporal features and a fourth neural network, a matrix of temporal attention weights wherein each weight indicates the importance of an instant (typically the instant of each 3D pose, i.e. instants associated with frames), modulating the feature map using the matrix of spatial attention weights to obtain a spatially modulated feature map, modulating the feature map using the vector of temporal attention weights to obtain a temporally modulated feature map, performing a convolution of the spatially modulated feature map and of the temporally modulated feature map to obtain a convoluted feature map, performing a classification using the convoluted feature map so as to determine the activity of the person in the video.

The neural networks of the invention use two different inputs: the sequence of frames of the video, and the 3D poses.

It has been observed by the inventors of the present invention that using the poses as input to obtain the most important features is particularly efficient as there is a strong correlation between human activities and human pose (i.e. the 3D poses). Using pose information has been observed to be the most natural way of automatically detecting discriminative image regions and frames from video clips.

Also, obtaining in a separate manner the attention weights for space and time has been observed to provide better results.

The person skilled in the art will know how to obtain poses from a sequence of frames. Also, it should be noted that while each pose is associated with a frame, not all frame may be associated with a pose (the number of poses may be smaller than the number of frames).

Also, the person skilled in the art will know which type of (recurrent) neural network can be used.

Attention weights are well known to the person skilled in the art.

Also, the classification can be performed by attributing a score to different classes of possible activities, the activity with the highest score being the activity performed by the person.

According to a particular embodiment, the first encoder neural network includes a portion of an inflated 3D (I3D) convolutional neural network.

It has been observed by the inventors that I3D can provide a four dimensional feature map on the basis of a video which has dimensions associated with time, space (typically two dimensions), and a number of channels (for example 1024 channels).

According to a particular embodiment, the method further comprises performing a Global Average Pooling (GAP) on the spatially modulated feature map and on the temporally modulated feature map prior to performing the convolution.

For example, GAP may be used for dimensionality reduction.

According to a particular embodiment, the convolution comprises a 1×1×1 convolution.

This convolution allows performing the classification, for example using the Softmax function which is well known in itself to the person skilled in the art.

According to a particular embodiment, the classification is performed using Softmax.

According to a particular embodiment, each pose illustrating a posture of the person from a frame of the sequence of frames includes a set of 3D coordinates indicating the position of joints of a given skeleton.

By way of example, such a skeleton defined by a set of 3D coordinates may be obtained using a Kinect sensor by the American company Microsoft.

According to a particular embodiment, the second neural network comprises at least one long short-term memory (LSTM) layer.

For example, three LSTM layers may be used to obtain better results.

These LSTM are particularly useful for obtaining features from sequences such as the sequence of poses.

According to a particular embodiment, the third neural network comprises a first fully connected layer, a hyperbolic tangent layer, a second fully connected layer, and a normalization layer, and the fourth neural network comprises a first fully connected layer, a hyperbolic tangent layer, a second fully connected layer, and a normalization layer.

According to a particular embodiment, the method comprises a preliminary training step of the first neural network and/or the second neural network and/or the third neural network and/or the fourth neural network.

According to a particular embodiment, the method comprises a preliminary training step of the first, second, third, and fourth neural network wherein a loss is determined using the cross-entropy loss, a loss based on the spatial attention weights, and a loss based on the temporal attention weights.

This training allows taking into account the attention weights.

The invention also proposes a device for recognizing person activity in a video comprising a sequence of frames, each frame showing at least a portion of the person, the device comprising:

a module for obtaining a set of consecutives 3D poses of the person using the sequence of frames, each pose illustrating a posture of the person from a frame of the sequence of frames, a module for obtaining a feature map elaborated using a first encoder neural network configured to receive the sequence of frames as input and to output the feature map having dimensions associated with time, space, and a number of channels, a module for obtaining a vector of spatiotemporal features using a second neural network outputting the vector of spatiotemporal features and receiving as input the set of consecutive poses, a module for obtaining, using the vector of spatiotemporal features and a third neural network, a matrix of spatial attention weights wherein each weight indicates the importance of a location in the matrix, a module for obtaining, using the vector of spatiotemporal features and a fourth neural network, a matrix of temporal attention weights wherein each weight indicates the importance of an instant, a module for modulating the feature map using the matrix of spatial attention weights to obtain a spatially modulated feature map, a module for modulating the feature map using the vector of temporal attention weights to obtain a temporally modulated feature map, a module for performing a convolution of the spatially modulated feature map and of the temporally modulated feature map to obtain a convoluted feature map, a module for performing a classification using the convoluted feature map so as to determine the activity of the person in the video.

This device may be configured to perform all the embodiments of the above defined method.

The invention also proposes a system comprising the device as defined above and equipped with a video acquisition module to obtain the video.

By way of example, the system may be a home (typically a smart home) or a vehicle.

In one particular embodiment, the steps of the method are determined by computer program instructions.

Consequently, the invention is also directed to a computer program for executing the steps of a method as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DESCRIPTION OF EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

In the present detailed description, examples are given for a method for recognizing person activity. By way of example, the method described herein can be used to detect the activities that a person can perform in a home (such as drinking, cooking, etc). By way of example, the method described herein may be used on a dataset such as the Toyota Smarthome dataset which may be downloaded at the following URL: https://project.inria.fr/toyotasmarthome/.

Figure 1:
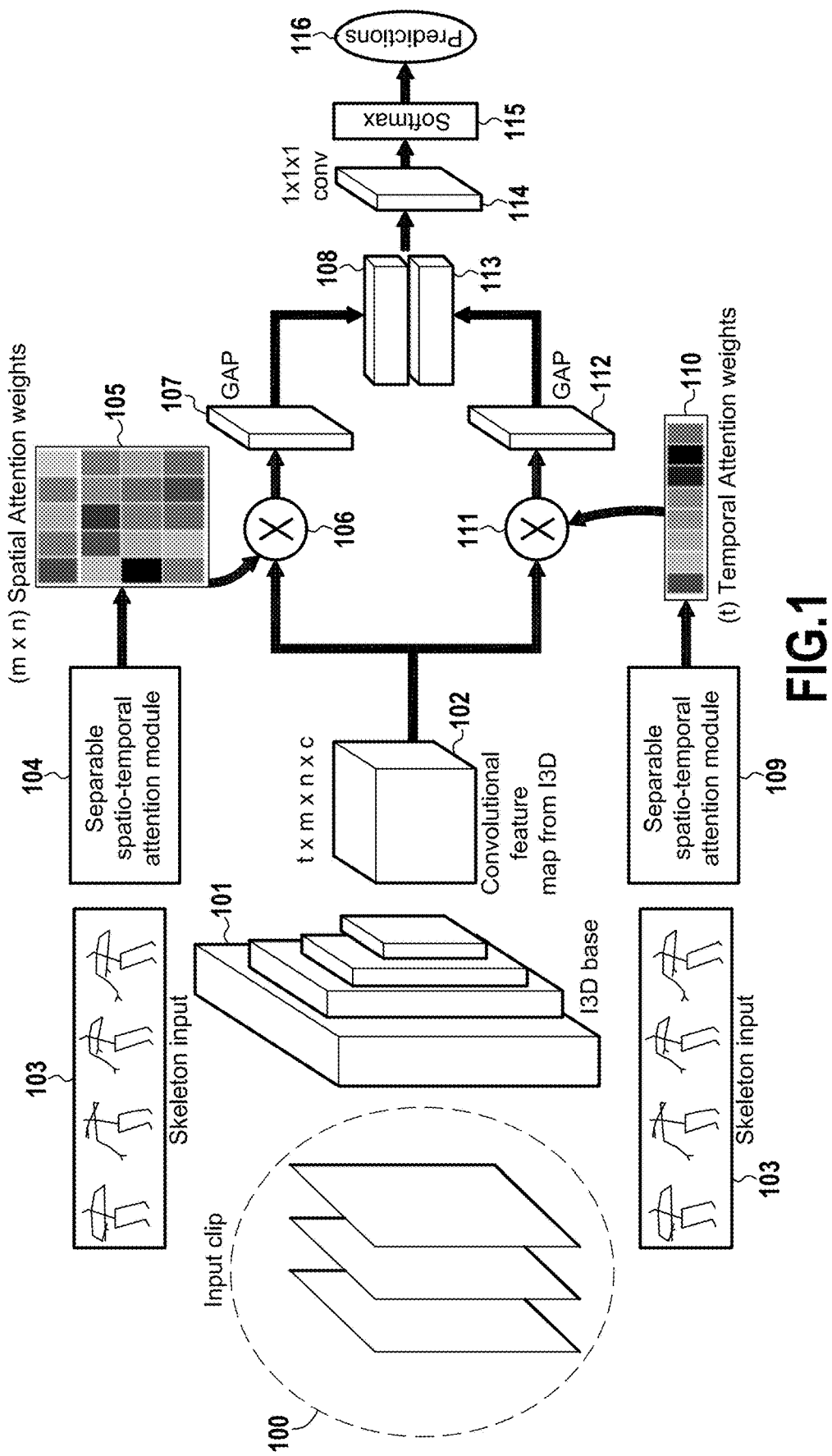
FIG. 1 is a schematic representation of the steps of a method according to an example.

On FIG. 1, the steps of a method of recognizing person activity are represented.

A first input on which the method may be applied is a video comprising a sequence of frames 100 (designated as an input clip on the figure). Each frame of the sequence of frames 100 shows at least a portion of a person, or of at least one person. For example, the sequence of frames 100 may comprise 64 frames showing at least a portion of a person. Obtaining the sequence may comprise cropping a video around a person.

By way of example, cropping a video around a person may comprise determining the position of a 2D bounding box around this person, for example using the method of "SSD: Single Shot Multibox Detector" (Liu, Wei, et al. *European conference on computer vision*. Springer, Cham, 2016.).

Additionally, the method of document "Slowfast networks for video recognition" (C. Feichtenhofer, H. Fan, J. Malik, and K. He. CoRR, abs/1812.03982, 2018.) may be used to process the video 100.

In a first step 101, the sequence of frames 100 is inputted to a first encoder neural network, for example a first encoder neural network trained for activity detection in a preliminary training step.

The first encoder neural network may be a portion of a neural network comprising an encoder and a decoder. For the present method, only the encoder portion is required as this step is performed so as to obtain a feature map having dimensions associated with time, space, and a number of channels. The person skilled in the art will be able to select the first encoder neural network to obtain such a feature map.

In the illustrated example, the first encoder neural network is a portion of an inflated 3D convolutional neural network, as described in document "Carreira et al., "Quo Vasis, Action recognition? A new model and the kinetics dataset," in *CVPR, 2017, pp. 4724-4733*". By way of example, the inflated 3D convolutional neural network may be obtained after the layer designated as Mixed_5 c in this document. More precisely, the encoder portion of the I3D network may include the first portion of the I3D extending to, but not including, the first GAP layer of this I3D network.

The first encoder neural network outputs a feature map 102 having dimensions txmxnxc, wherein t is associated with time, m and n are spatial dimensions which may differ from the height and width of the input frames 100. The feature map 102 may also be called a convolutional feature map. By way of example, m and n may be equal to 7 and c may be equal to 1024.

A second input to the method is a set 103 of consecutives 3D poses of the person shown in the sequence of frames. On the figure, this set is designated as a skeleton input. The set 103 may be obtained in a preliminary step in which the sequence of frames is processed. For example, the skeleton may be a skeleton obtained using the Kinect method by Microsoft.

The set 103 may comprise 3D poses (or skeletons) of the form $x=(x_1, \ldots, x_j)$, with $x_j \in \mathbb{R}^3$ being a spatial coordinate. In x, each $x_j$ is the position in space of a joint of the skeleton in a manner which is similar to the Kinect method.

On the figure, the set of 3D poses 103 is shown twice as it is used in two different steps.

In step 104 a vector of spatiotemporal features is obtained using a second recurrent neural network which receives the set of 3D poses as input. Also, in this step, a third neural network is used to obtain a matrix 105 of spatial attention weights wherein each weight indicates the importance of a location in the matrix. Step 104 will be described in more detail hereinafter in reference to FIG. 2.

The matrix 105 of spatial attention weights is then used in step 106 in which it is used to modulate the feature map 102. More precisely, in step 106, the following operation is performed:

$$g_s = \text{reshape}(\alpha)^* g$$

Wherein g is the feature map 102, a is the spatial attention map 105, reshape(x) is the operation to transform x to match the dimension of the feature map g, and $g_s$ is the spatially modulated feature map obtained after step 106.

The output of step 106 may be processed by a Global Average Pooling (GAP) layer 107. GAP layers are known to the skilled person and will not be described in more detail for the sake of conciseness.

The output of the GAP layer 107 bears reference 108 on the figure.

The set of 3D poses is also used in step 109 in which a vector a vector of spatiotemporal features is obtained using the second recurrent neural network which receives the set of 3D poses as input (this step may be common to both steps 104 and 109). Also, in this step, a fourth neural network is used to obtain a matrix 110 (or map) of temporal attention weights wherein each weight indicates the importance of an instant.

Each instant is associated with a 3D pose from the set of 3D poses, and each pose may also be associated with a frame of the sequence of frames. Therefore, the matrix of temporal attention weights indicates which instant in the sequence of frames are important (or salient).

Then, a modulation is performed as follows in step 111:

$$g_t = \text{reshape}(\beta)^* g$$

Wherein $g_t$ is the temporally modulated feature map obtained after step 111, β is the temporal attention weights matrix 110. With respect to step 106, the reshape(x) function is adapted as the matrix 110 has only one dimension.

A GAP step 112 is performed to obtain an output 113.

The outputs of the two GAP layers 108 and 113 are concatenated and then convoluted using a 1×1×1 convolutional operation. Then, a classification is performed in step 115 so as to classify activities. Typically, the output of the classification comprises a series of scores or probabilities associated with given classes (for example, drinking, cooking, etc.).

It should be noted that the classification may be performed using the Softmax function.

Steps 104 and 109 will now be described in more detail by referring to FIG. 2.

On this figure the set of 3D poses or skeletons 103 is used as input to both steps. Three steps are then performed which are common to both steps 104 and 109: these steps comprise successively inputting the set of 3D poses to a first long short-term memory layer (121 on the figure, LSTM), inputting the output of the first LSTM layer 121 to a second LSTM layer 122, and inputting the output of the second LSTM layer 122 to a third LSTM layer 123 so as to obtain a vector of spatiotemporal features.

The three LSTM layers form a second recurrent neural network. This recurrent neural network may be trained in a preliminary step using a given set of 3D poses and known poses. To this end and during this preliminary training step, fully connected layers with Softmax may be added to the three LSTM layers so as to output classification scores and allow the calculation of losses to train these three LSTM layers.

For example, the first LSTM layer may comprise 512 LSTM units, the second LSTM layer may comprise 512 LSTM units, and the third one may comprise 128 LSTM units.

It has been observed by the inventors of the present invention that separating spatial and temporal attention weights into two separate branches is easier to perform than trying to obtain spatiotemporal attention weights and provides better results.

Thus, in step 104, obtaining the spatial attention map 105 comprises using a third neural network 124 comprising a first fully connected layer 125, an hyperbolic tangent layer 126, a second fully connected layer 127, and a sigmoid layer 128.

The first fully connected layer 125 performs the following operation:

$$W_{h_1}h^* + b_{h_1}$$

With h* being a hidden vector found in the vector of spatiotemporal features, $W_{h_1}$ being a parameter having a value which may be found during a preliminary training step, and $b_{h_1}$ being a bias also having a value which may be found during a preliminary training step.

The hyperbolic tangent layer 126 then performs the following operation: $\tan h(W_{h_1}h^* + b_{h_1})$. This operation may be referred to by the person skilled in the art as tan h squashing.

Then, a second fully connected layer 127 is used to perform the following operation and to obtain a first score $s_1$:

$$s_1 = W_{s_1} \tan h(W_{h_1}h^* + b_{h_1}) + b_{s_1}$$

Wherein $W_{s_1}$ is a parameter having a value which may be found during a preliminary training step and $b_{s_1}$ being a bias also having a value which may be found during a preliminary training step.

In order to obtain attention weights, the score $s_1$ is used in the following in the sigmoid layer 128 which performs the following operation to obtain the spatial attention weight a (also used in the above modulation function):

$$\alpha = \sigma(W_o s_1 + b_o)$$

Wherein $\sigma(x)$ is the sigmoid function, $W_\sigma$ is a parameter having a value which may be found during a preliminary training step and $b_\sigma$ is a bias also having a value which may be found during a preliminary training step.

It has been observed by the inventors that the sigmoid function performs a better normalization for the spatial attention weights than other functions such as Softmax which may lead to gradient vanishing.

Concerning the temporal attention weights, in step 109, obtaining the temporal attention map 110 comprises using a fourth neural network 129 comprising a first fully connected layer 130, an hyperbolic tangent layer 131, a second fully connected layer 132, and a Softmax layer 133.

The first fully connected layer 130 performs the following operation:

$$W_{h_2}h^* + b_{h_2}$$

With h* being a hidden vector found in the vector of spatiotemporal features, $W_{h_2}$ being a parameter having a value which may be found during a preliminary training step, and $b_{h_2}$ being a bias also having a value which may be found during a preliminary training step.

The hyperbolic tangent layer 131 then performs the following operation: $\tan h(W_{h_2}h^* + b_{h_2})$. This operation may be referred to by the person skilled in the art as tan h squashing.

Then, a second fully connected layer 132 is used to perform the following operation and to obtain a second score $s_2$:

$$s_2 = W_{s_2} \tan h(W_{h_2}h^* + b_{h_2}) + b_{s_2}$$

Wherein $W_{s_2}$ is a parameter having a value which may be found during a preliminary training step and $b_{s_2}$ being a bias.

In order to obtain attention weights, the score $s_2$ is used in the following in the Softmax layer 133 which performs the following operation to obtain the spatial attention weights $\beta_k$ (also used in the above modulation function as $\beta$ for the sake of simplicity, k being an index comprised between 1 and t indicating the instant):

$$\beta_k = \frac{\exp(s_{2;k})}{\sum_{i=1}^{t} s_{2,i}}$$

Training the neural network of the above method may be performed on the basis of a dataset such as the above-mentioned Toyota Smarthome dataset.

More precisely, it is possible to train in a joint manner the first, second, third and fourth neural networks. The training phase may comprise fine-tuning the first encoder neural network without taking the second to fourth neural network into account (namely the attention weights). This may be done as to obtain a first encoder neural network which can be used for activity classification, the cross-entropy loss may be used to this end. At this stage, the training dataset may only include videos of persons performing known activities.

Subsequently, the entire network (including the first to the fourth neural network) can be trained using the cross-entropy loss, a loss based on the spatial attention weights, and a loss based on the temporal attention weights. For example, this end-to-end training can be done using the following function:

$$L = L_c + \lambda_1 \sum_{j=1}^{m \times n} \|\alpha_j\|_2 + \lambda_2 \sum_{j=1}^{t} (1 - \beta_j)^2$$

Wherein $L_c$ is the cross-entropy loss for C activity labels, $\lambda_1$ and $\lambda_2$ are regularization parameters (which may be set to 0,00001).

The first regularization term which is multiplied by $\lambda_1$ has been observed to regularize the learned spatial attention weights $\alpha$ with the $l_2$ norm (known in itself by the person skilled in the art) so as to avoid their explosion.

The second regularization term which is multiplied by $\lambda_2$ has been observed to force the model (i.e. the neural networks) to pay attention to all the segments or instants in the feature map as it may be prone to ignore segments in the temporal dimension otherwise. These segments may have a substantial contribution in modeling activities. By way of example, it is possible to impose $\beta_j \approx 1$ during the training phase.

Also, training the neural network may comprise using the Adam Optimizer as described in "A method for stochastic optimization" (D. P. Kingma and J. Ba. AdamCoRR, abs/1412.6980, 2014).

Figure 2:
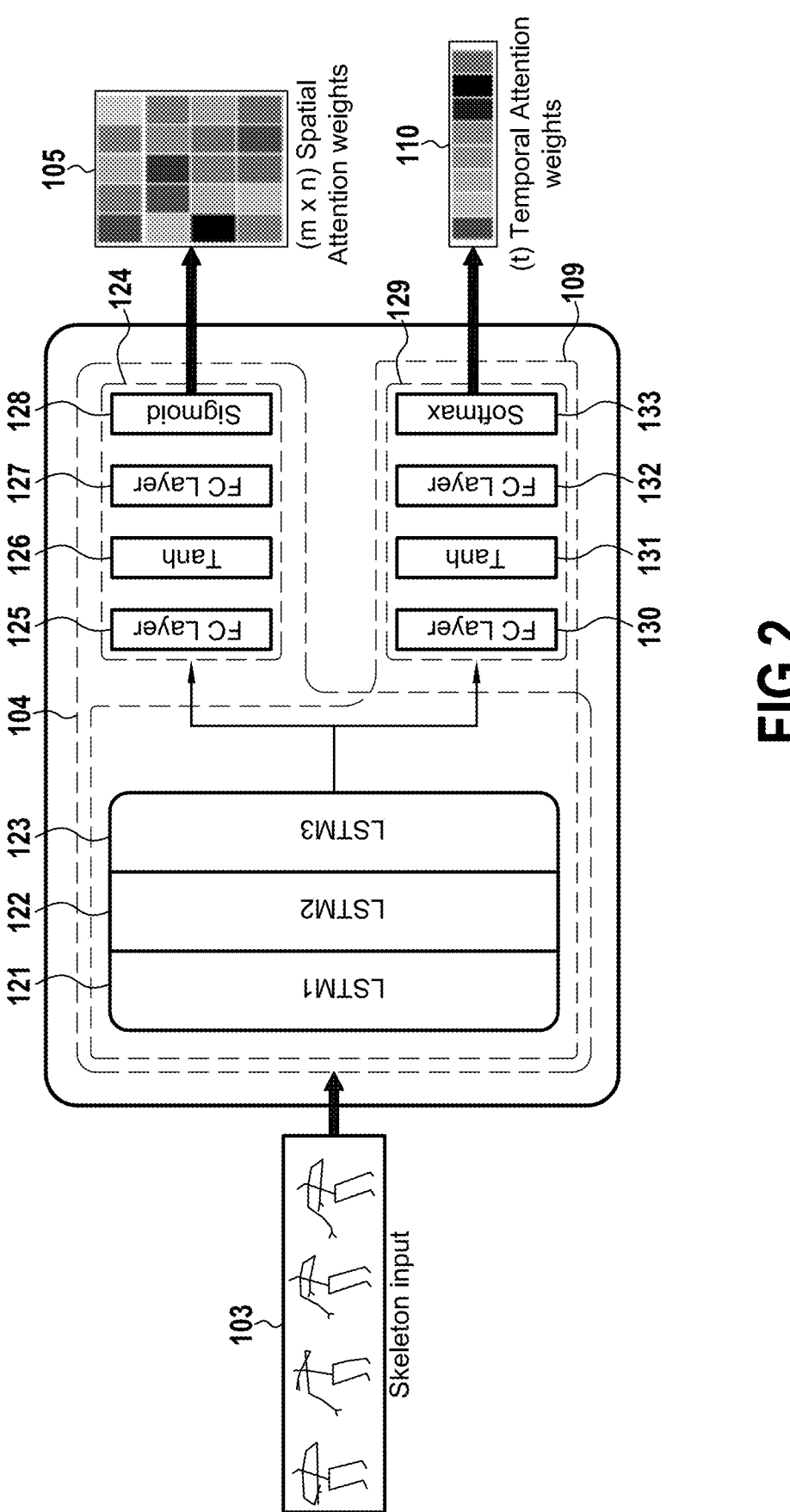
FIG. 2 is a more detailed version of the steps for obtaining the attention weights.
Figure 3:
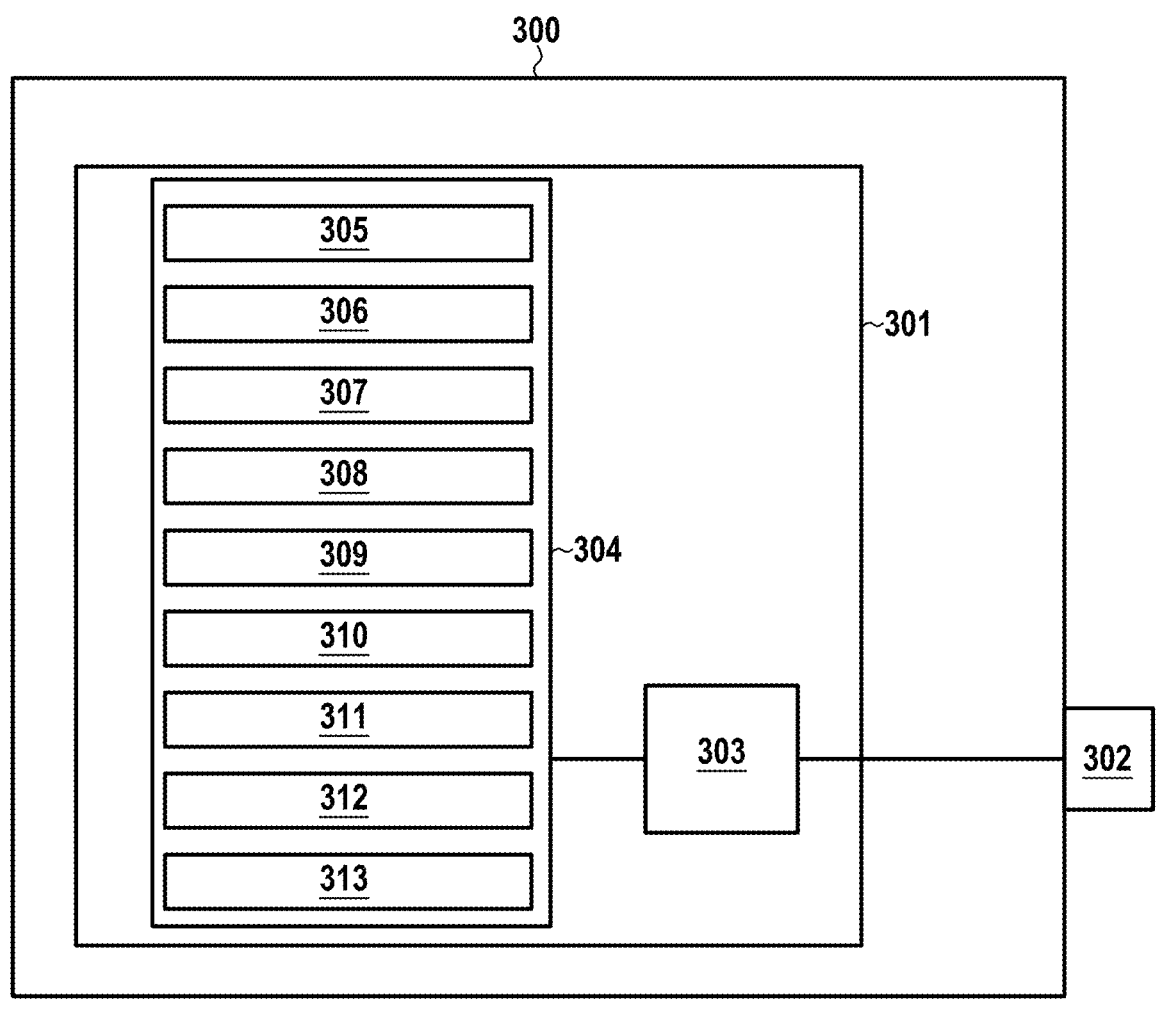
FIG. 3 is a schematic representation of a system according to an example.

FIG. 3 is a schematic representation of a system 300 such as a home or a vehicle which includes a device 301 configured to perform the method described in relation to FIG. 1 and FIG. 2.

The system 300 comprises a video acquisition module 302 which can acquire the video 100 and the acquired video is inputted to the device 301 and more precisely to a processor 303 of the device.

In the illustrated example, the method is performed using a computer program stored in a non-volatile memory 304 and comprising a set of instructions 305, 306, 307, 307, 309, 310, 311, 312, and 313, which, when executed by the processor 303, form respectively the following modules:

a module for obtaining a set of consecutives 3D poses of the person using the sequence of frames, each pose illustrating a posture of the person from a frame of the sequence of frames, a module for obtaining a feature map elaborated using a first encoder neural network configured to receive the sequence of frames as input and to output the feature map having dimensions associated with time, space, and a number of channels, a module for obtaining a vector of spatiotemporal features using a second neural network outputting the vector of spatiotemporal features and receiving as input the set of consecutive poses, a module for obtaining, using the vector of spatiotemporal features and a third neural network, a matrix of spatial attention weights wherein each weight indicates the importance of a location in the matrix, a module for obtaining, using the vector of spatiotemporal features and a fourth neural network, a matrix of temporal attention weights wherein each weight indicates the importance of an instant, a module for modulating the feature map using the matrix of spatial attention weights to obtain a spatially modulated feature map, a module for modulating the feature map using the vector of temporal attention weights to obtain a temporally modulated feature map, a module for performing a convolution of the spatially modulated feature map and of the temporally modulated feature map to obtain a convoluted feature map, a module for performing a classification using the convoluted feature map so as to determine the activity of the person in the video.

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method for recognizing person activity in a video comprising a sequence of frames, each frame showing at least a portion of the person, the method comprising:

obtaining a set of consecutive 3D poses of the person using the sequence of frames, each of the consecutive 3D poses illustrating a posture of the person from a frame of the sequence of frames, and each of the consecutive 3D poses being associated with an instant in the sequence of frames, obtaining a feature map elaborated using a first encoder neural network configured to receive the sequence of frames as input and to output the feature map having dimensions associated with time, space, and a number of channels, obtaining a vector of spatiotemporal features using a second recurrent neural network configured to receive the set of consecutive 3D poses of the person as input, a third neural network receiving the vector of spatiotemporal features as input and outputting a matrix of spatial attention weights, wherein each weight indicates an importance of a location in the matrix, wherein the third neural network comprises a first fully connected layer, a hyperbolic tangent layer, a second fully connected layer, and a sigmoid layer, a fourth neural network, different from the third neural network, the fourth neural network receiving the vector of spatiotemporal features as input and outputting a matrix of temporal attention weights, wherein each weight indicates a saliency of an instant in the sequence of frames, wherein the fourth neural network comprises a first fully connected layer, a hyperbolic tangent layer, a second fully connected layer, and a Softmax layer, obtaining a spatially-modulated feature map by modulating the feature map using the matrix of spatial attention weights, obtaining a temporally-modulated feature map, different from the spatially-modulated feature map, by modulating the feature map using the matrix of temporal attention weights, performing a convolution of the spatially modulated feature map and of the temporally modulated feature map to obtain a convoluted feature map, performing a classification using the convoluted feature map so as to determine the activity of the person in the video.

2. The method according to claim 1, wherein the first encoder neural network includes a portion of an inflated 3D convolutional neural network.

3. The method according to claim 1, further comprising, prior to the performing the convolution:

performing a Global Average Pooling on the spatially-modulated feature map; and performing a Global Average Pooling on the temporally modulated feature map.

4. The method according to claim 1, wherein the performing the convolution comprises performing a $1 \times 1 \times 1$ convolution.

5. The method according to claim 1, wherein the performing the classification comprises using a Softmax function.

6. The method according to claim 1, wherein each of the consecutive 3D poses comprises a set of 3D coordinates $(x\_j)$ indicating positions of joints of a given skeleton.

7. The method according to claim 1, further comprising:

a preliminary training step of at least one of the first encoder neural network, the second recurrent neural network, the third neural network, and the fourth neural network.

8. The method according to claim 1, further comprising:

a preliminary training step comprising:

determining a loss using a cross-entropy loss, determining a loss based on the matrix of spatial attention weights, and determining a loss based on the matrix of temporal attention weights.

9. A device for recognizing person activity in a video comprising a sequence of frames, each frame showing at least a portion of the person, the device comprising:

a module for obtaining a set of consecutive 3D poses of the person using the sequence of frames, each of the consecutive 3D poses illustrating a posture of the person from a frame of the sequence of frames, and each of the consecutive 3D poses being associated with an instant in the sequence of frames, a first encoder neural network configured to receive the sequence of frames as input and to output the feature map having dimensions associated with time, space, and a number of channels, a second neural network configured to receive the set of consecutive 3D poses of the person as input and to output a vector of spatiotemporal features, a third neural network configured to receive the vector of spatiotemporal features as input and to output a matrix of spatial attention weights, wherein each weight indicates an importance of a location in the matrix, wherein the third neural network comprises a first fully connected layer, a hyperbolic tangent layer, a second fully connected layer, and a sigmoid layer, a fourth neural network, different from the third neural network, configured to receive the vector of spatiotemporal features as input and to output a matrix of temporal attention weights, wherein each weight indicates a saliency of an instant in the sequence of frames, wherein the fourth neural network comprises a first fully connected layer, a hyperbolic tangent layer, a second fully connected layer, and a Softmax layer, a module for obtaining a spatially-modulated feature map by modulating the feature map using the matrix of spatial attention weights, a module for obtaining a temporally-modulated feature map, different from the spatially-modulated feature map, by modulating the feature map using the matrix of temporal attention weights, a module for performing a convolution of the spatially modulated feature map and of the temporally modulated feature map to obtain a convoluted feature map, a module for performing a classification using the convoluted feature map so as to determine the activity of the person in the video.

10. A system comprising the device of claim 9 and comprising a video acquisition module configured to obtain the video.

11. A non-transitory computer-readable medium comprising instructions stored thereon that when executed by a processor cause the processor to execute instructions for executing the steps of the method according to claim 1.

*  *  *  *  *